(12) United States Patent
Couto Maquieira et al.

(10) Patent No.: US 11,679,651 B2
(45) Date of Patent: Jun. 20, 2023

(54) OPENING CONTROL DEVICE WITH A MECHANICAL POP-OUT

(71) Applicant: AKWEL VIGO SPAIN SL, Vigo Pontevedra (ES)

(72) Inventors: Delmiro Javier Couto Maquieira, Pontevedra (ES); Alberto Diez Estevez, Pontevedra (ES); Javier Casal Gomez, Vigo (ES)

(73) Assignee: AKWEL VIGO SPAIN S.L, Vigo Pontevedra (ES)

( * ) Notice: Subject to any disclaimer, the term of this patent is extended or adjusted under 35 U.S.C. 154(b) by 1007 days.

(21) Appl. No.: 16/356,770

(22) Filed: Mar. 18, 2019

(65) Prior Publication Data

US 2019/0283555 A1    Sep. 19, 2019

(30) Foreign Application Priority Data

Mar. 16, 2018  (FR) ...................................... 18/70301

(51) Int. Cl.
| | |
|---|---|
| *E05B 85/10* | (2014.01) |
| *B60J 5/04* | (2006.01) |
| *E05B 81/90* | (2014.01) |
| *E05B 81/00* | (2014.01) |
| *E05B 85/16* | (2014.01) |

(52) U.S. Cl.
CPC ............ *B60J 5/0416* (2013.01); *E05B 81/00* (2013.01); *E05B 81/90* (2013.01); *E05B 85/103* (2013.01); *E05B 85/107* (2013.01)

(58) Field of Classification Search
CPC ...... Y10S 292/31; E05B 85/10; E05B 85/103; E05B 85/107; E05B 5/00; E05B 5/003; E05B 5/006
See application file for complete search history.

(56) References Cited

U.S. PATENT DOCUMENTS

| | | | |
|---|---|---|---|
| 3,993,338 A | 11/1976 | Cherbourg et al. | |
| 4,728,133 A | 3/1988 | Valley | |

(Continued)

FOREIGN PATENT DOCUMENTS

| | | |
|---|---|---|
| CN | 105649437 A | 6/2016 |
| DE | 10 2004 054 189 A1 | 5/2006 |

(Continued)

OTHER PUBLICATIONS

Jan. 6, 2022 Office Action Issued In U.S. Appl. No. 16/356,277.

(Continued)

*Primary Examiner* — Carlos Lugo
(74) *Attorney, Agent, or Firm* — Oliff PLC

(57) ABSTRACT

An opening control device including a case, a handle movably mounted between at least a flush position in which the handle is entirely or partially housed within the case and an ejected position in which the handle is at least partially emerged from the case. The opening control device includes a mechanism configured to be mechanically triggered in response to a push-in action into the case of the handle, the completion of the push-in action being adapted to cause the triggering of the mechanism. Furthermore, the mechanism is configured to automatically drive in movement the handle over all or part of a stroke starting from a pushed position of the handle to the flush position through the ejected position.

21 Claims, 9 Drawing Sheets

(56) References Cited

U.S. PATENT DOCUMENTS

| | | | |
|---|---|---|---|
| 4,889,373 A * | 12/1989 | Ward | E05B 13/002 |
| | | | 292/DIG. 31 |
| 5,685,584 A | 11/1997 | Baren et al. | |
| 6,460,905 B2 * | 10/2002 | Suss | E05B 81/04 |
| | | | 292/336.3 |
| 6,598,913 B2 * | 7/2003 | Meinke | E05B 85/107 |
| | | | 292/DIG. 31 |
| 7,552,954 B2 | 6/2009 | Rozo et al. | |
| 7,866,714 B2 | 1/2011 | Monig et al. | |
| 8,579,337 B2 | 11/2013 | Hidding et al. | |
| 8,701,353 B2 | 4/2014 | Patel et al. | |
| 9,605,452 B2 | 3/2017 | Yoshino et al. | |
| 10,435,926 B2 * | 10/2019 | Brown | E05B 85/103 |
| 10,487,547 B2 * | 11/2019 | Malvy | E05B 81/06 |
| 10,563,437 B2 | 2/2020 | Bartels et al. | |
| 10,655,371 B2 | 5/2020 | Soonthornwinate et al. | |
| 10,794,096 B2 * | 10/2020 | Hamacher | E05B 5/006 |
| 10,954,702 B2 * | 3/2021 | Couto Maquieira | E05B 81/16 |
| 2016/0222705 A1 | 8/2016 | Velicanin | |
| 2016/0281397 A1 | 9/2016 | Park et al. | |
| 2016/0290018 A1 | 10/2016 | Hamacher et al. | |
| 2018/0274271 A1 | 9/2018 | Och et al. | |
| 2019/0024422 A1 | 1/2019 | Inan et al. | |
| 2019/0218835 A1 * | 7/2019 | Karlein | E05B 81/28 |
| 2021/0156178 A1 | 5/2021 | Heyduck et al. | |

FOREIGN PATENT DOCUMENTS

| | | | | |
|---|---|---|---|---|
| DE | 10 2004 058 874 A1 | 6/2006 | | |
| DE | 10 2012 210 278 A1 | 12/2013 | | |
| DE | 10 2014 117 005 A1 | 5/2016 | | |
| DE | 10 2015 011 468 A1 | 3/2017 | | |
| DE | 10 2016 101 568 A1 | 8/2017 | | |
| DE | 10 2016 113 695 A1 | 1/2018 | | |
| DE | 102016217647 A1 | 3/2018 | | |
| EP | 3 141 679 A1 | 3/2017 | | |
| EP | 3 255 231 A1 | 12/2017 | | |
| FR | 2 941 994 A1 | 8/2010 | | |
| FR | 3 024 173 A1 | 1/2016 | | |
| FR | 3023865 A1 * | 1/2016 | | E05B 77/06 |
| FR | 3 026 131 A1 | 3/2016 | | |
| FR | 3071861 A1 * | 4/2019 | | |
| FR | 3087810 A1 * | 5/2020 | | |
| GB | 2 536 672 A | 9/2016 | | |
| JP | H07-269177 A | 10/1995 | | |
| WO | 2016113339 A1 | 7/2016 | | |
| WO | 2018/137839 A1 | 8/2018 | | |

OTHER PUBLICATIONS

U.S. Appl. No. 16/356,277, filed Mar. 18, 2019 in the name of Delmiro Javier Couto Maquieira et al.
U.S. Appl. No. 16/356,904, filed Mar. 18, 2019 in the name of Delmiro Javier Couto Maquieira et al.
Aug. 25, 2021 Office Action issued in U.S. Appl. No. 16/356,904.
Oxford English Dictionary, Definition of Bracket, 2021, Lexico.com, https://www.lexico.com/en/definition/bracket (Year: 2021).
Jul. 18, 2022 Office Action Issued in U.S. Appl. No. 16/356,277.
Apr. 15, 2022 Office Action Issued In U.S. Appl. No. 16/356,904.
Aug. 24, 2022 Notice of Allowance issued in U.S. Appl. No. 16/356,904.
Dec. 5, 2022 Notice Of Allowance issued in U.S. Appl. No. 16/356,277.

* cited by examiner

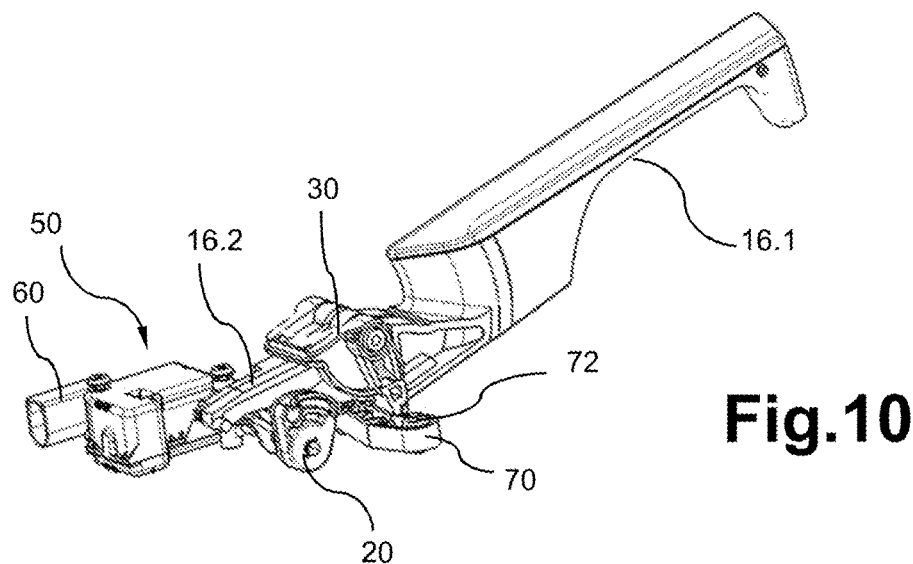
Fig.10
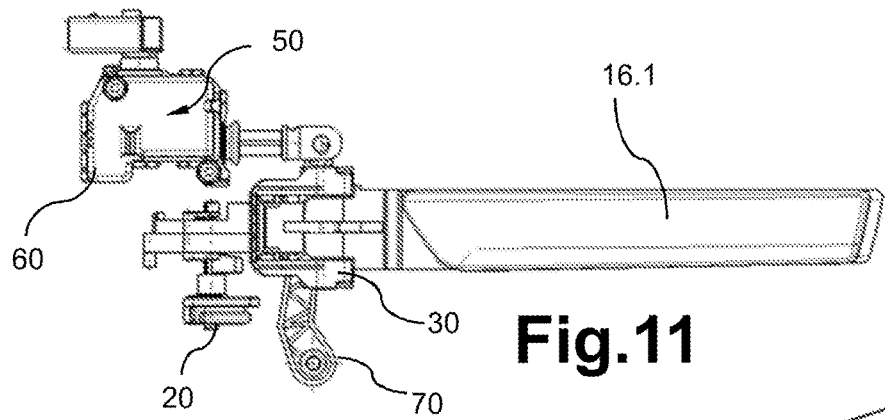
Fig.11
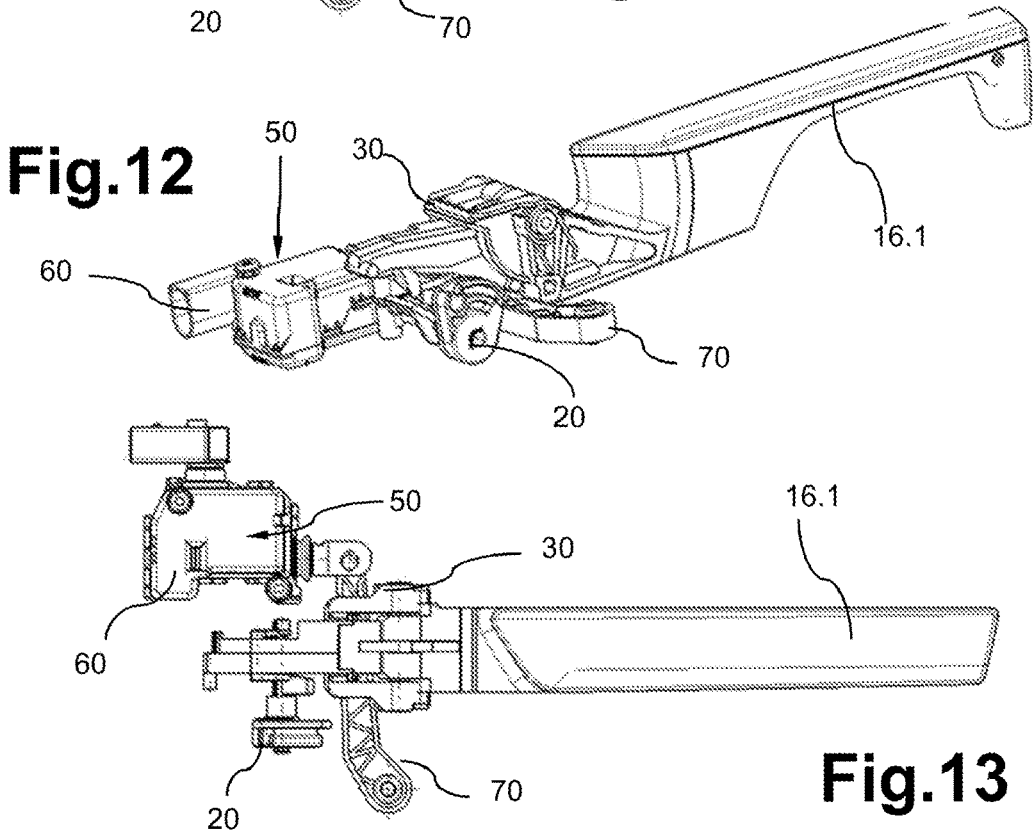
Fig.12
Fig.13

OPENING CONTROL DEVICE WITH A MECHANICAL POP-OUT

The present invention concerns an opening control device for a door leaf of a motor vehicle. More particularly and not exclusively, the invention concerns an external opening control device which comprises backup mechanical unlocking means for the event of failure of the electrical actuation means of the latch. This opening control device also applies well to an unlocking with a conventional latch or with an electrically actuated latch, also known as «electronic latch» or «e-latch».

In general, an external opening control device comprises a fixed support configured to be mounted on the door leaf and a handle movably mounted on the support, for example pivotally mounted on the support by being rotatably hinged about an axis.

The opening control device also comprises an unlocking mechanism, which when the handle is maneuvered in traction, enables unlocking of the latch and thus opening of the door. Conventionally, the latch comprises a bolt secured to the door adapted to cooperate with a striker secured to the door adapted to cooperate with a striker secured to the body. When opening the door from outside the vehicle, the bolt is released from the striker by actuation of the external opening control device.

More particularly, the invention concerns an opening control device with a «flush» type handle, that is to say that the support on which the handle is movably mounted forms a cavity adapted to receive the handle in the retracted configuration. In this retracted configuration, the external surface of the handle flushes with the external surface of the external wall of the door leaf. In the emerged or deployed configuration, the handle emerges at least partially from the cavity of the support to be able to be grasped by a user of the vehicle in order to open the door. For this purpose, the user can displace the handle further outwards in order to control the latch of the door.

In general, the opening control device comprises an electrical ejection mechanism of the handle to enable the gripping of the handle by the user and the opening of the door leaf. The electrical ejection mechanism operates through an electrical power supply delivered for example by a battery of the motor vehicle and can be remotely and electronically controlled thanks to a key, a mobile phone or any other device enabling a remote communication.

Nonetheless, in case of failure of this electric power supply, the electrically ejected handle cannot be used and the user cannot get in the vehicle. Hence, it is necessary to provide a backup mechanism allowing unlocking the door of the vehicle in particular when the battery has not enough energy for the electrical ejection mechanism to operate.

The invention aims at overcoming these drawbacks and providing a compact and robust opening control device enabling mechanical backup unlocking in a simple manner.

To this end, an object of the invention is an opening control device for a door leaf of a motor vehicle of the type comprising:
- a case configured to be mounted on the door leaf,
- a handle mounted movable in rotation relative to the case between at least a flush position in which the handle is entirely or partially housed within the case and an ejected position in which the handle is at least partially emerged from the case,
- a mechanism configured to be mechanically triggered in response to at least one push-in action into the case of the handle, the completion of the push-in action being adapted to cause the triggering of the mechanism, characterized in that the mechanism comprises a drive member configured to accumulate a mechanical energy during the push-in action of the handle and to restitute a mechanical energy for driving in movement the handle as of the completion of the push-in action(s), so as to automatically drive in movement the handle over all or part of a stroke starting from a pushed position of the handle to the flush position through the ejected position.

Thanks to this manually-actuated mechanism, it is possible to eject the handle without any electrical assistance. Moreover, the mechanism enables an automatic retraction of the handle into its flush position without the help of any electrical assistance.

An opening control device may comprise one or more of the following features.

In a preferred embodiment of the invention, the mechanism comprises a drive member, a kinematic chain for mechanically popping-out the drive member and a kinematic chain for mechanically driving the handle by the drive member.

Preferably, the drive member is configured to accumulate a mechanical energy during the push-in action of the handle and to restitute a mechanical energy for driving in movement the handle as of the completion of the push-in action.

For example, the drive member comprises a shaft, a barrel and a drive spring housed within the barrel and wound into a spiral around the barrel shaft.

In a preferred embodiment of the invention, the drive member comprises a pop-out wheel provided with a toothing at the periphery thereof securely mounted to the barrel shaft.

For example, the drive spring comprises an end internal to the winding fastened to the barrel shaft and an external end fastened to the barrel.

In a preferred embodiment of the invention, the drive kinematic chain comprises a shaft for driving in movement the handle provided with an eccentric for transforming a rotary movement of the shaft into an alternating pivoting movement of the handle.

Preferably, the drive shaft and the barrel shaft comprise one-way rotatable linking means.

For example, the one-way linking means comprise a cam and a blocking element movable between a projecting active position engaged with the cam and a stowed position disengaged from the cam.

In a preferred embodiment, the cam is carried by the barrel shaft and the blocking element is mounted inside a cylindrical cage shaped into a hub body for receiving the barrel shaft.

Preferably, the pop-out kinematic chain comprises at least one means for transmitting the push-in movement of the handle to the drive member.

In a preferred embodiment of the invention, the transmission means is a lever pivotally mounted relative to the case and has a circular sector shape pivotally linked at one end to a push-in stop member of the handle and forming at the other end an arc of circle of a toothed gear.

Preferably, the transmission ratio from the transmission means to the drive wheel of the drive member is defined such that the push-in of the handle causes an angular rotation of the pop-out wheel by $2\pi$.

Preferably, the mechanism comprises a means for stopping the drive kinematic chain during the push-in action.

In a preferred embodiment, the stop means comprises an elastically-biased transmission pawl pivotally mounted on the pop-out kinematic chain and a lever for blocking the drive kinematic chain mounted so as to tilt between a stop position and a start position of the drive chain, the lever having a spout or nose or finger adapted to engage with the transmission pawl on completion of the push-in action so as to enable the tilting of the lever from the stop position to the start position of the drive kinematic chain.

For example, the pop-out kinematic chain comprises a one-way transmission gear train from the handle toward the drive member, in particular of the freewheel type.

Preferably, the freewheel comprises a one-way clutch comprising a pair of toothed pinions coupled to each other in rotation at least in one direction thanks to respective coupling elements.

In a preferred embodiment, the drive kinematic chain comprises a dampening member configured to slow down the stroke of the handle at least from the ejected position to the flush position.

Preferably, the opening control device further comprises a lever for pivoting the handle in ejection and/or retraction and means for electrically actuating the pivot lever.

Preferably, the lever has a bracket shape inside which the handle can be engaged and comprises at least one upper crossbar for bearing on an upper bearing wall of the handle and a lower crossbar for bearing on a lower bearing wall of the handle and the lever comprises a member for elastically returning the lever.

In another preferred embodiment, the blocking lever of the drive kinematic chain is mounted to tilt between a stop position and a start position of the chain, the lever being adapted to tilt into the start position when exceeding a pop-out predefined spring torque threshold of the drive member.

Preferably, the pop-out kinematic chain comprises a push member with a spring forming a push-in stop of the handle and configured to urge a movement when releasing the handle.

In a preferred embodiment, the pivot lever remains immobile during the pop-out and the mechanical driving of the handle by the drive member.

Other features and advantages of the invention will appear in light of the following description, made with reference to the appended drawings in which:

FIGS. 10 to 20 illustrate steps of operation of the opening control device of FIG. 1.

Figure 1:
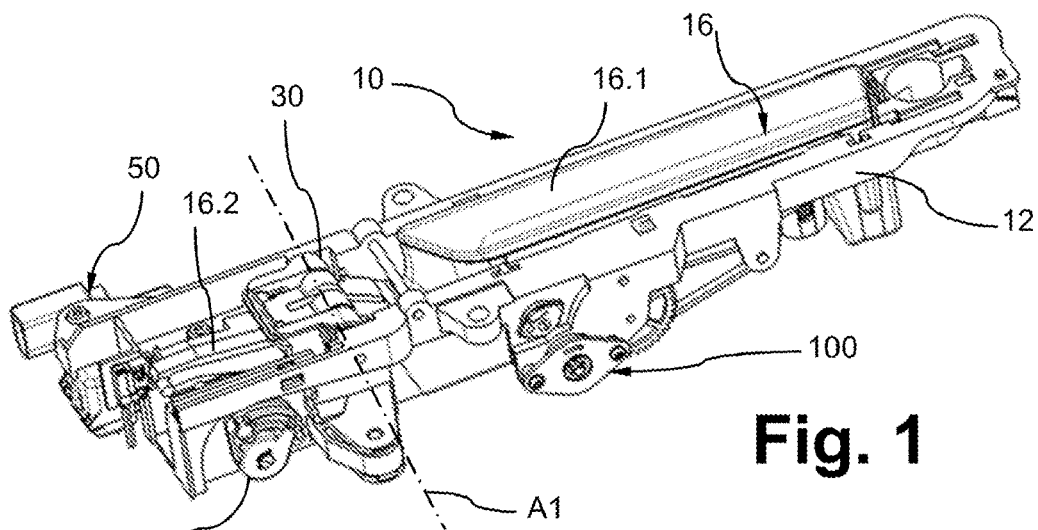
FIG. 1 is a perspective view of an opening control device according to the invention.

There is schematically represented in FIG. 1 an opening control device for a door leaf of a motor vehicle according to the invention. The opening control device is referred to by the general reference 10.

The opening control device 10 is configured to be mounted on a body external panel (not represented) of a door leaf which is for example a vehicle side door.

The opening control device 10 mainly includes a fixed support or case 12 having a cavity 14 for receiving a handle and a handle 16 movably mounted inside the cavity 14. In service, the support 12 is configured to be fastened to the door leaf. In the described example, the handle 16 is hingedly mounted relative to the panel, about a pivot geometric axis A1, on the support 12. In service position, the pivot axis is substantially vertical and extends parallel to the general plane of the external panel.

In the illustrated example, the support 12 has a parallelepiped general shape and is adapted to be housed within a cutout or a recess of the external panel of the door leaf such that its external face is flush with the surface of the external panel of the door leaf. Moreover, the support 12 is open on the side of its external face and closed by a bottom surface on the internal side in order to delimit the cavity 14 configured to house the handle 16.

Figure 2:
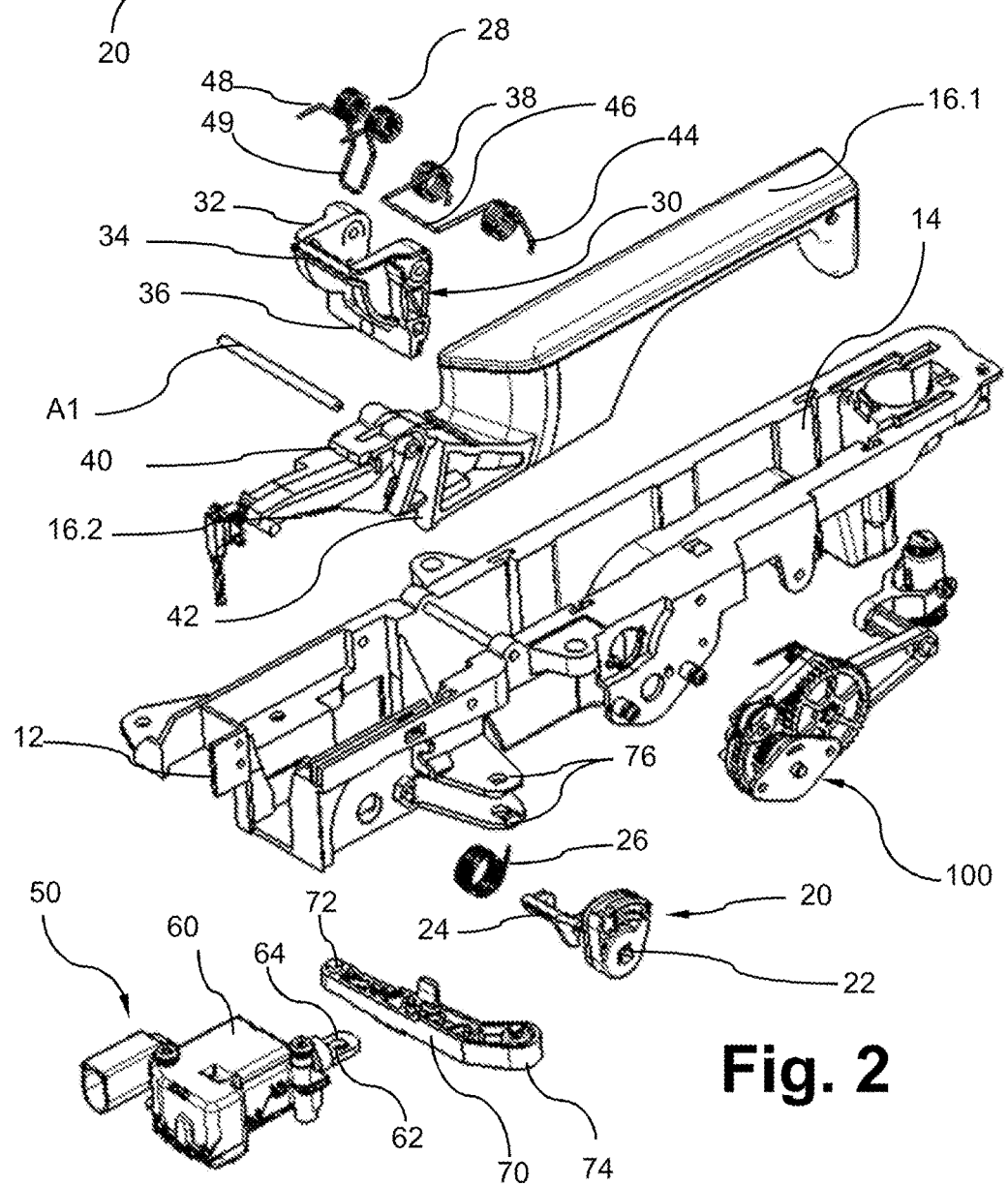
FIG. 2 is an exploded perspective view of the opening control device of FIG. 1.
Figure 3:
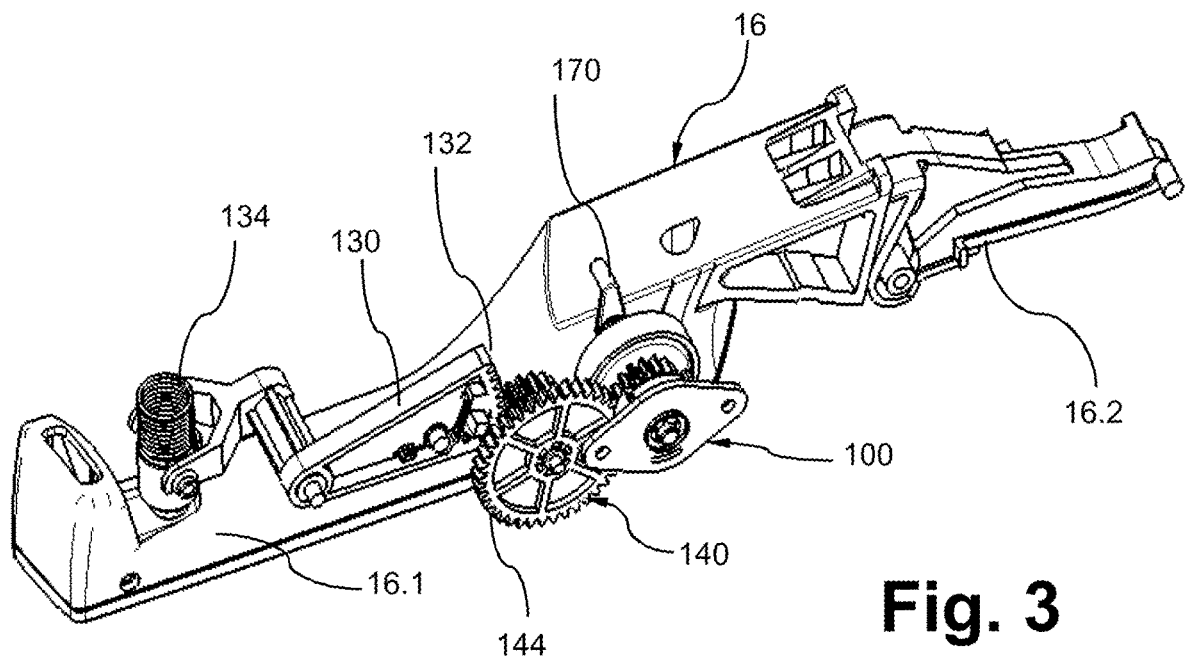
FIG. 3 is a bottom perspective view of a mechanically-actuatable mechanism of the opening control device of FIG. 1.

The handle 16 is represented in detail in FIG. 2. The handle 16 has an outer portion 16.1 that the user can grasp. Opposite to the outer portion 16.1, the handle 16 has an inner portion 16.2 which is configured to extend inside the housing 14 of the case 12 forming a support as shown in FIG. 2. Conventionally, on the outer portion 16.1, the handle 16 includes a gripping paddle 18, which generally has a flat and elongate shape.

In the described example, the handle 16 is of the «flush» type, that is to say that the support 12 on which the handle 16 is movably mounted forms the cavity 14 adapted to receive the handle 16 in a retracted configuration. In this retracted configuration, the external surface of the handle 16 is flush with the external surface of the external wall of the door leaf. In the emerged or deployed configuration, the handle 16 emerges at least partially from the cavity 14 of the support 12 to be able to be grasped by a user of the vehicle in order to open the door. For this purpose, the use can displace the handle 16 in traction further toward the outside in order to control the latch of the door. In the flush position, the external surface of the opening control device 10 coincides with the external surface of the door leaf. This «flush» arrangement, known in the automotive industry, allows adding value to the style of the vehicle and reduces the aerodynamic drag.

Nonetheless, it should be understood that other movable mountings might be considered, such as in particular by pivoting about an axis located at another position or else by translation along a direction essentially perpendicular to the general plane of the door. It should also be noted that the movable mounting of the handle relative to the support is known per see to those skilled in the art.

The opening control device 10 is configured to cooperate with a latch (not represented) of the door leaf of the motor vehicle capable of adopting a locked configuration and an unlocked configuration. Conventionally, pivoting of the handle 16 about its hinge axis A1 actuates the latch in either one of its two locked or unlocked configurations via a drive kinematic chain (not represented in the figures).

To this end, as illustrated in FIGS. 1 and 2, the opening control device 10 comprises a transmission lever 20. This transmission lever 20 comprises in the described example a rotary cage 22 and a transmission shaft 24 as well as a transmission return spring 26 configured to be housed inside the rotary cage 22. The rotary cage 22 comprises for example a means for retaining an end of a Bowden cable (not represented). The set 20 is configured to be mounted on the support 12 as illustrated in FIG. 1.

In the example illustrated in FIG. 2, the opening control device 10 comprises an electrical portion 50 enabling an electrical actuation of the ejection and/or of the retraction of the handle 16 and a mechanical portion 100 enabling a mechanical actuation of the movement of the handle 16.

We will now describe in detail the electrical portion 50. For its electrical operation, as illustrated in FIG. 2, the opening control device 10 preferably further comprises a lever 30 for pivoting the handle 16. This pivot lever 30 is mounted on the pivot axis A1 of the handle 16. Thus, the pivot lever 30 is linked to the handle 16 by at least one common axis of rotation A1.

This pivot lever 30 has a clamp-like general shape through which the inner portion 16.1 of the handle can be engaged (FIG. 2).

The ejection bracket 30 has first and second lateral cheeks 32 parallel to each other and perpendicular to the common axis of rotation A1. These cheeks 32 are on the one hand linked to each other by an upper cross-bar 34 configured to bear against an upper bearing wall 40 of the inner branch 16.2 of the handle 16 and on the other hand by a lower cross-bar 36 which is configured to bear against a lower bearing wall 42 of the inner branch 16.2 of the handle 16.

The opening control device 10 further comprises a return member 38 linked to the bracket 30. This return member 38 is configured to return the bracket 30 into a rest position corresponding to the flush configuration of the handle 16.

This return member 38 preferably comprises a bracket spring provided with two external feet 44 and with a central portion 46. In FIG. 2, it is shown that each of the two feet of the bracket spring 38 is fastened to an internal wall of the case 12.

In the described example, the handle 16 is provided with a member 28 for returning the handle 16 which is placed between the bracket 30 and the inner portion 16.1 of the handle 16 and which have the axis A1 as a common axis.

The handle return spring 28 has two feet 48 configured to be fastened to the bracket 30 and a central portion 49 engaged with the inner portion 16.2. The role of the handle return spring 28 is to maintain a contact between the inner portion 16.2 of the handle 16 and the pivot bracket 30, by a return force and thus compensate a clearance between the inner portion 16.1 and the bracket 30.

Furthermore, the electrical operation portion 50 comprises in this example an electric actuator 60 linked to an ejection arm 70 configured to pivotally extend transversely inside the case 12 as shown in FIG. 1. The electric actuator 60 preferably comprises a linear cylinder 62 provided with an end 64 cooperating with an end 72 of the ejection arm. For example, the end 64 comprises a notch and the end 72 comprises a projecting lug.

As illustrated, as example in FIG. 2, the ejection arm 70 comprises an end 74 pivotally mounted between two parallel flanges 76 of the case 12.

In the electrical operation illustrated by FIGS. 10 to 13, the user gives for example an opening order to an onboard computer of the motor vehicle which sends an electronic signal to the actuator 60. This order causes a displacement of a cylinder 62 of the actuator 60.

During the phase of ejecting the handle 16, the actuator 60 transmits a movement via the cylinder 62 to the ejection arm 70. The ejection arm 70 is configured to drive the bracket 30 against the return force of the spring of the ejection lever 38, for example by pressing against the crossbar 36 of the bracket 30. The bracket 30, which has been held in the rest position by its return spring 38, is displaced until the handle 16 reaches its ejection position. In this ejection position, the user can pull the handle 16, against the spring 28 of the handle 16, and act on the transmission lever 20 to actuate the cable of the latch. Furthermore, preferably, the spring 28 between the handle 16 and the bracket 30 allows making the handle 16 return into the ejected position on completion of the action of the user by accompanying the displacement of the bracket 30.

During the phase of retracting the handle 16, the actuator 60 is for example powered with an opposite polarity and displaces the ejection arm 70 in the reverse direction. The ejection arm 70 then preferably accompanies the movement of the bracket 30 whose return spring 38 tends to return into its rest position. The handle 16 accompanies the bracket 30 by the action of its return spring 28.

Hence, in this example, the actuator 60 is bi-stable.

In the case where the electrical operation turns out to be impossible because of a failure, the opening control device 10 includes in accordance with the invention a backup mechanism 100 preferably provided with an elastic energy accumulator. In order to reload the elastic energy accumulator, the handle 16 should be pushed in toward the inside of the body. This action makes the handle 16 pivot about its axis A1 in opposition to its return spring 28. In the mechanical operation, preferably, the bracket 30 remains immobile. Indeed, in the manual mechanical operation, the bracket 30 remains in its rest position because there is a clearance between the bracket 30 and the handle 16 enabling the movement of the handle 16 without urging the bracket 30.

We will now describe in detail this mechanism 100 which is illustrated in FIGS. 3 to 9.

In accordance with the invention, the mechanism 100 can be manually actuated by pushing in the handle 16 into a pushed-in position in the case 12 and is configured to automatically drive and mechanically drive in movement the handle 16.

In particular, the mechanism 100 is configured to be mechanically triggered in response to a push-in action in the case 12 of the handle 16, the completion of the push-in action being adapted to cause the triggering of the mechanism 100. The mechanism 100 is configured to automatically drive in movement the handle 16 over all or part of a stroke starting from a pushed-in position of the handle 16 to the flush position through the ejected position. Preferably, the mechanism 100 is configured to drive in movement the handle 16 over the entire stroke.

Figure 5:
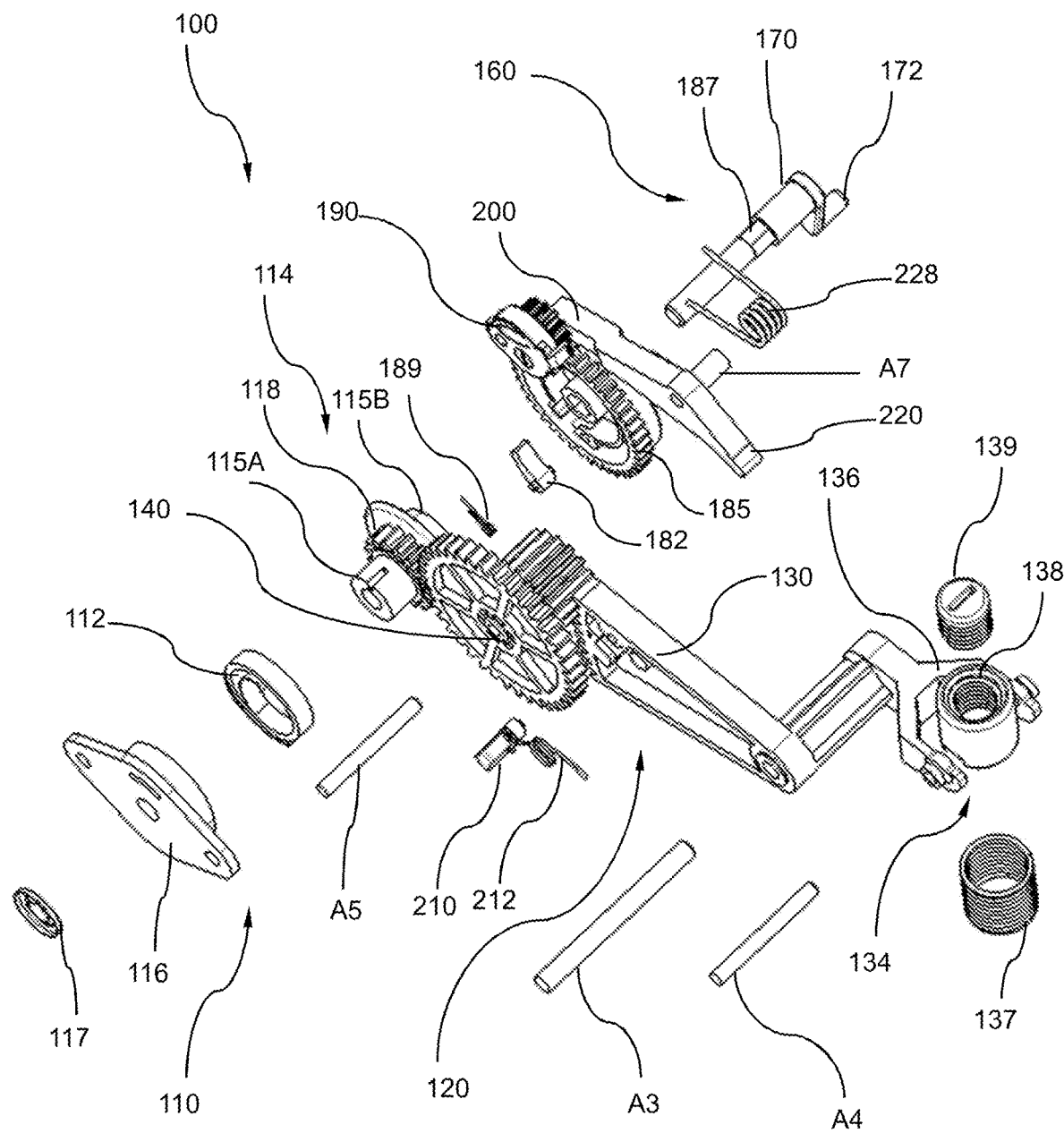
FIG. 5 is an exploded view of a backup mechanism of the opening control device of FIG. 1.
Figure 6A:
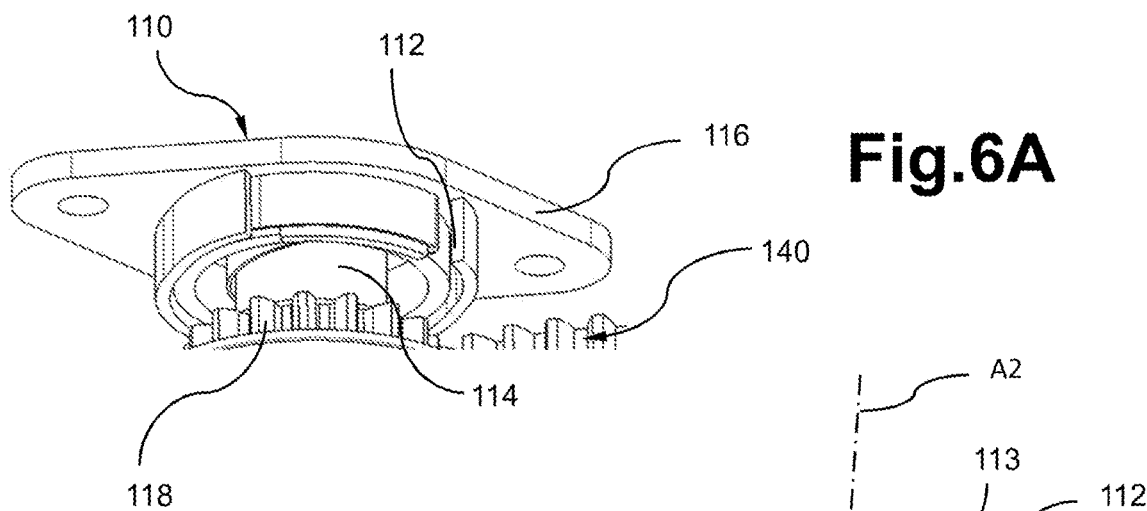
FIGS. 6A to 6D represent detail views of a drive member of the opening control device according to the invention.
Figure 6B:
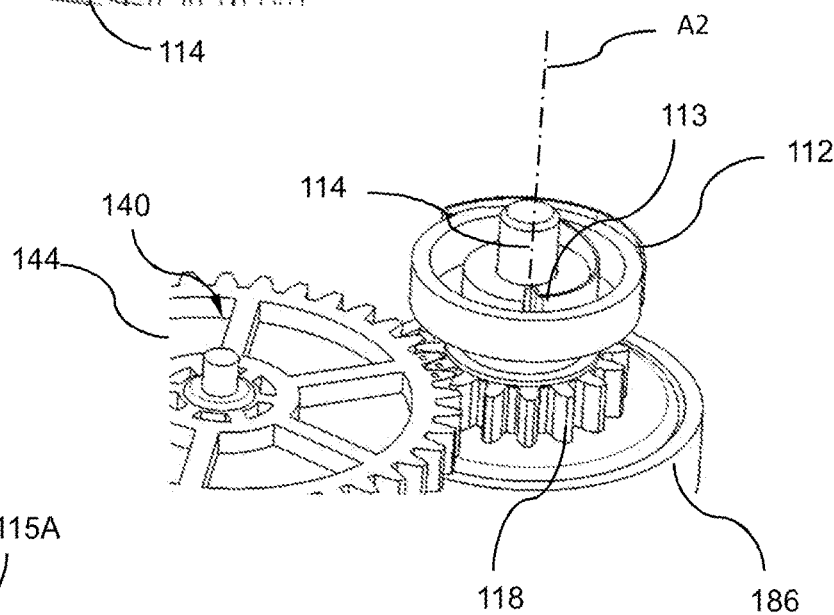
Figure 6C:
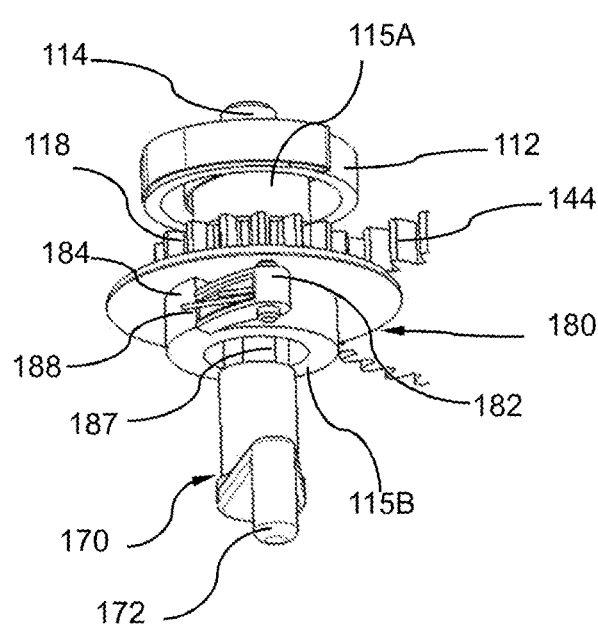
Figure 6D:
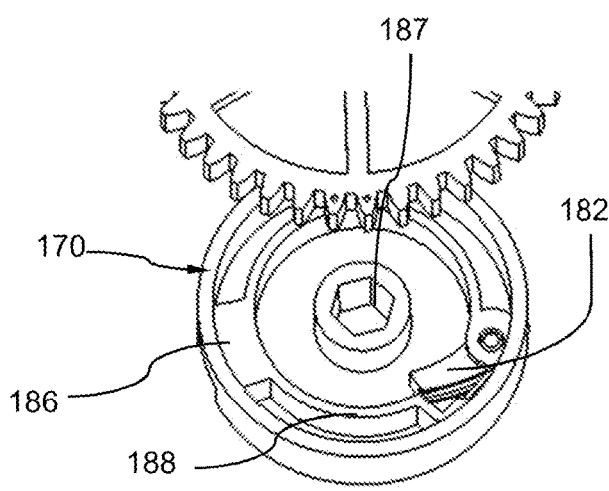
Figure 7A:
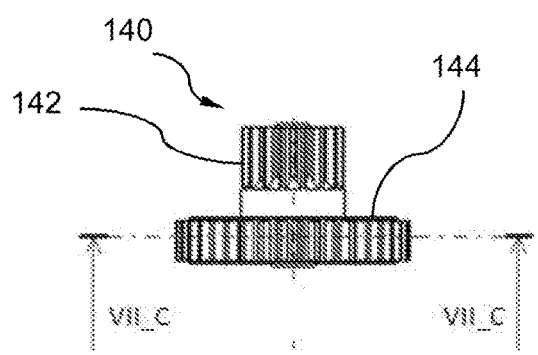
FIGS. 7A to 7D represent detail views of a freewheel-type transmission gear train of a pop-out kinematic chain of the opening control device according to the invention.
Figure 7C:
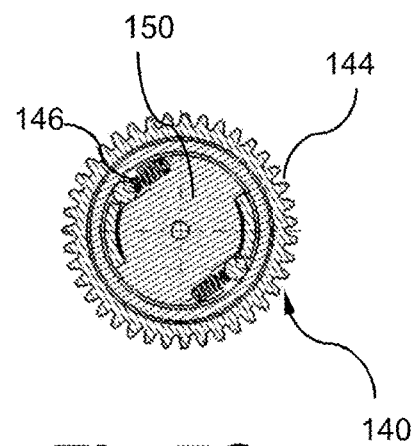
Figure 7B:
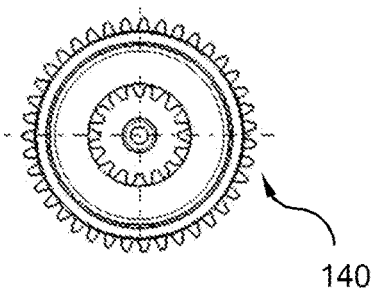
Figure 7D:
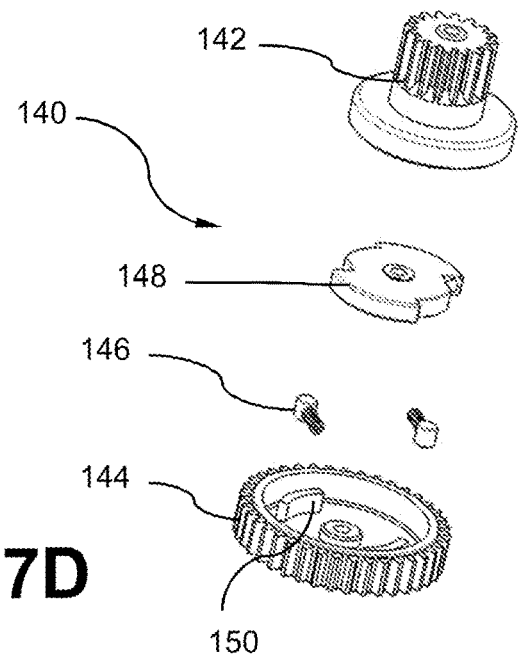
Figure 8:
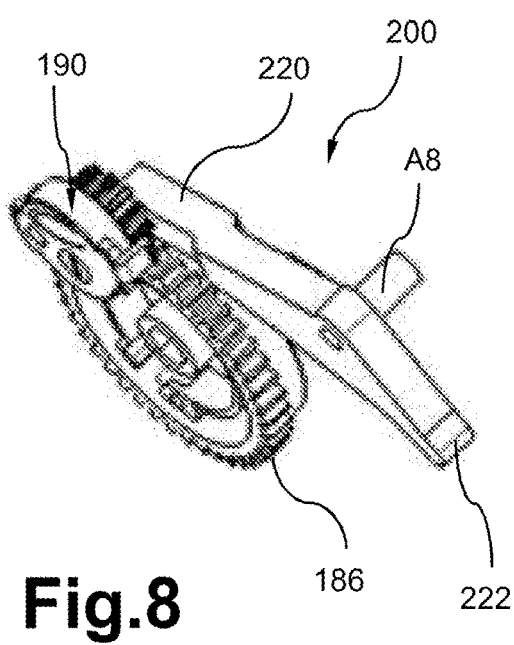
FIGS. 8 and 9 represent a detail view of a rotary damper of a drive kinematic chain of the opening control device according to the invention.

As illustrated in detail in FIG. 5 and in FIGS. 6A to 6D, the mechanism 100 preferably comprises a drive member 110. In the described example, the drive member 110 comprises a spiral-shaped drive spring 112, including for example a metallic leaf wound on itself. The drive member 110 includes a shaft 114 according to an axis A2, a winding barrel 116 and the drive spring 112 housed within the barrel 116 wound into a spiral around the barrel shaft 114. In the described example, the barrel 116 is secured to the support 112. For example, the winding barrel 116 is fastened by welding or screwing to this support 12.

Preferably, the drive member 110 further comprises a pop-out wheel 118 provided with a peripheral gear toothing. In the example illustrated in FIG. 5, the pop-out wheel 118 is securely mounted to the barrel shaft 114, preferably in a middle portion of the barrel shaft 114.

Moreover, the power spring 112 is placed coaxially with the pop-out wheel 118, which turns about the axis A2. This drive spring 112 comprises an external end fastened to the barrel 116 and an internal end fastened to the barrel shaft 114. For example, each of the external and internal ends of the drive spring 112 comprises a fold configured to be received inside a groove formed in the barrel 116 and in the shaft 114. For example, the shaft 114 comprises a radial groove 113. In the described example, the drive member 110 further comprises a thrust washer 117.

Figure 16:
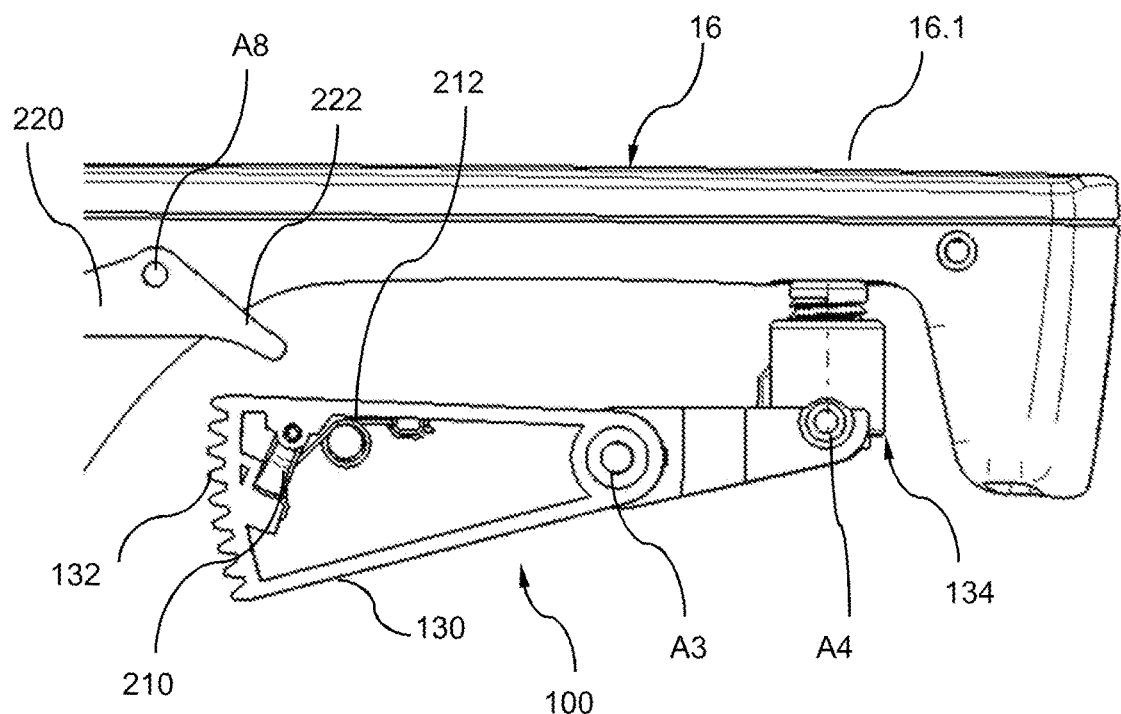
Figure 17:
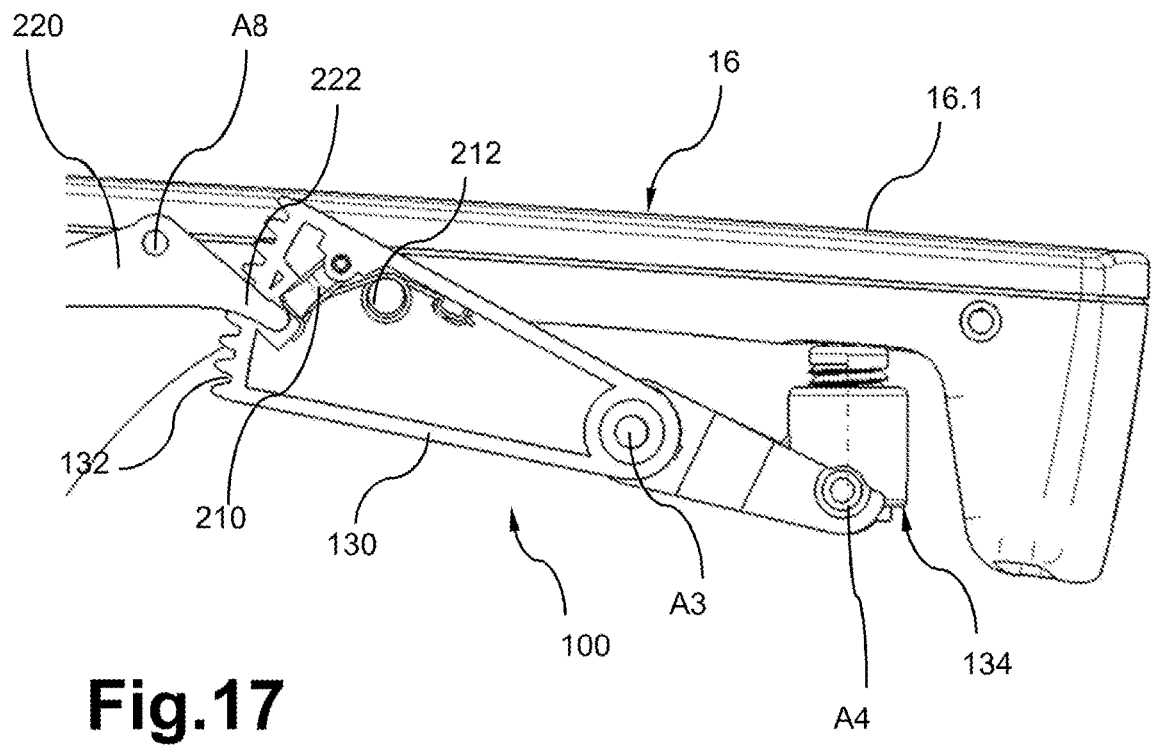

Furthermore, the mechanism 100 further comprises a kinematic chain 120 for popping out the drive member 110. The kinematic chain 120 comprises at least one means 130 for transmitting the push-in movement of the handle 16 to the drive member 110. Preferably, as shown in FIGS. 16 and 17, the means 130 comprises a gear portion 132 adapted to, directly or as in the described example indirectly, make the pop-out wheel 118 of the drive member 110 turn and is also linked to a member 134 for stopping the push-in of the handle 16.

Furthermore, the means 130 is preferably pivotally mounted about an axis A3 relative to the case 12 and has a circular sector shape pivotally linked at its central end to the push-in stop member 134 of the handle 16 and forming at the other end an arc of circle of a toothed gear 132.

To this end, preferably, the pop-out kinematic chain 120 comprises a push member 134 with a spring forming a push-in stop of the handle 16 and configured to urge a movement during the release of the handle 16. The pusher 134 comprises a sleeve 138, an elastomeric stop 139 housed within the sleeve 138 and a stop return spring 137. The central end of the transmission lever 130 comprises a fork 136 with two arms for receiving a transverse pivot axis A4 of the stop member 134. The push-in stop member 134 is configured to come into contact with a lower face of the outer portion 16.1 of the handle 16.

During the phase of pushing in the handle 16 by a user, the pivoting of the handle 16 causes a displacement of the stop 134, which slips inwards against its return spring 137.

The lower end of the stop 144 is rotatably linked to the transmission lever 130 by the axis A4, so that a displacement of the stop 134 causes the rotation of the transmission lever 130 about its axis A3.

Preferably, the reduction ratio of the transmission means 130 to the pop-out wheel 118 of the drive member 110 is defined such that the push-in of the handle 16 causes an angular rotation of the pop-out wheel 118 by 2π.

Furthermore, the pop-out kinematic chain 120 further comprises a transmission gear train 140, interposed between the transmission means 130 and the drive member 110. The main function of this transmission gear train 140 is to prevent the operation of the pop-out chain 120 in the direction opposite to the direction from the handle 16 toward the drive member 110.

To this end, the transmission gear train 140 is unidirectional from the handle toward the drive member 110. For example, the one-way transmission gear train 140 comprises a set of gears of the type with a freewheel. As illustrated in detail in FIGS. 7A to 7D, the set of gears 140, also referred to as disconnecting wheel or as freewheel comprises a one-way clutch arranged to turn in one single direction.

This type of clutch is well known in the prior art. For example, the disconnecting wheel set 140 includes to this end a pair of pinions, an input gear pinion 142 and an output gear pinion 144 cooperating through a disconnecting transmission so that it is possible to transmit a rotation torque in only one direction of rotation (clockwise direction of rotation in FIGS. 18 to 20).

Figure 18:
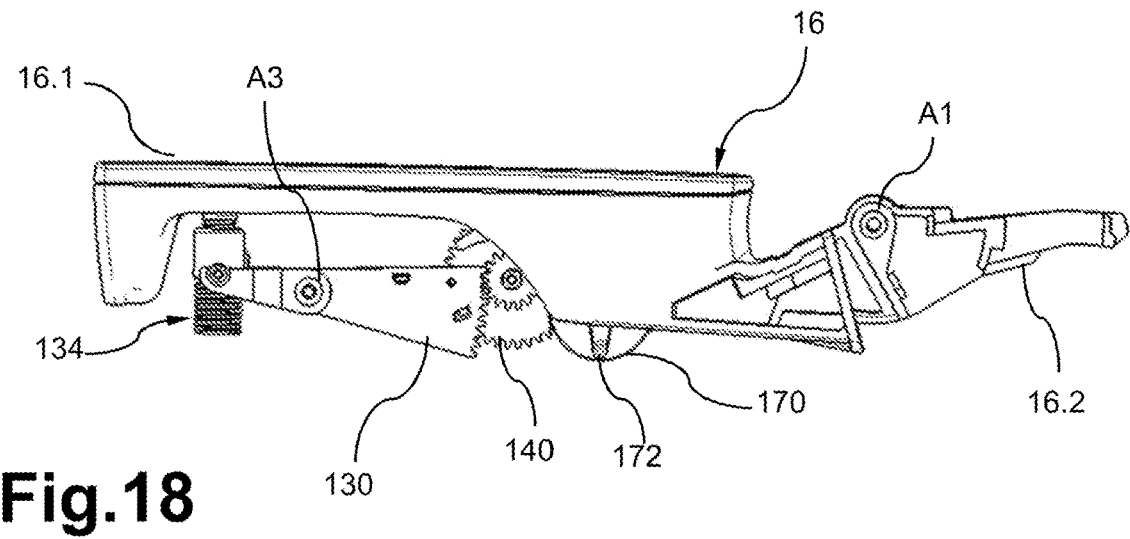
Figure 19:
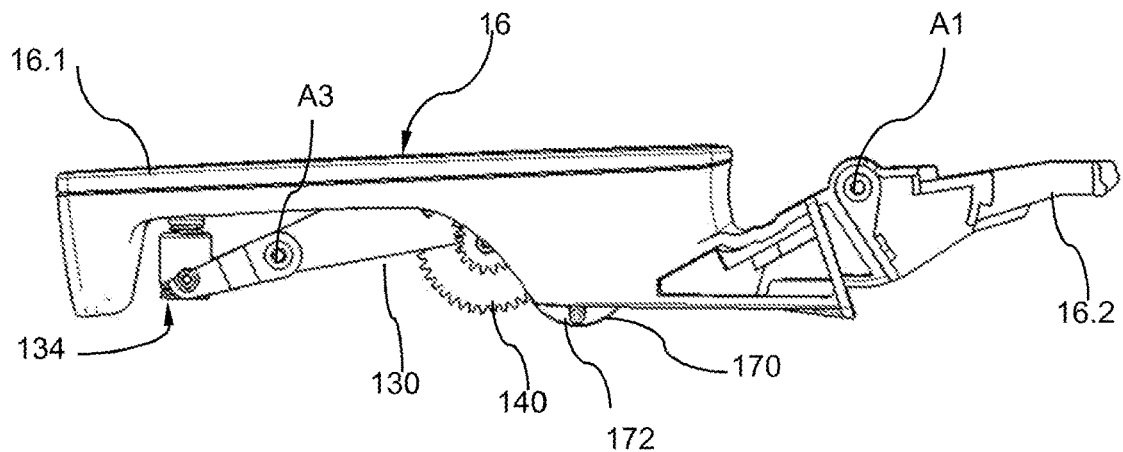
Figure 20:
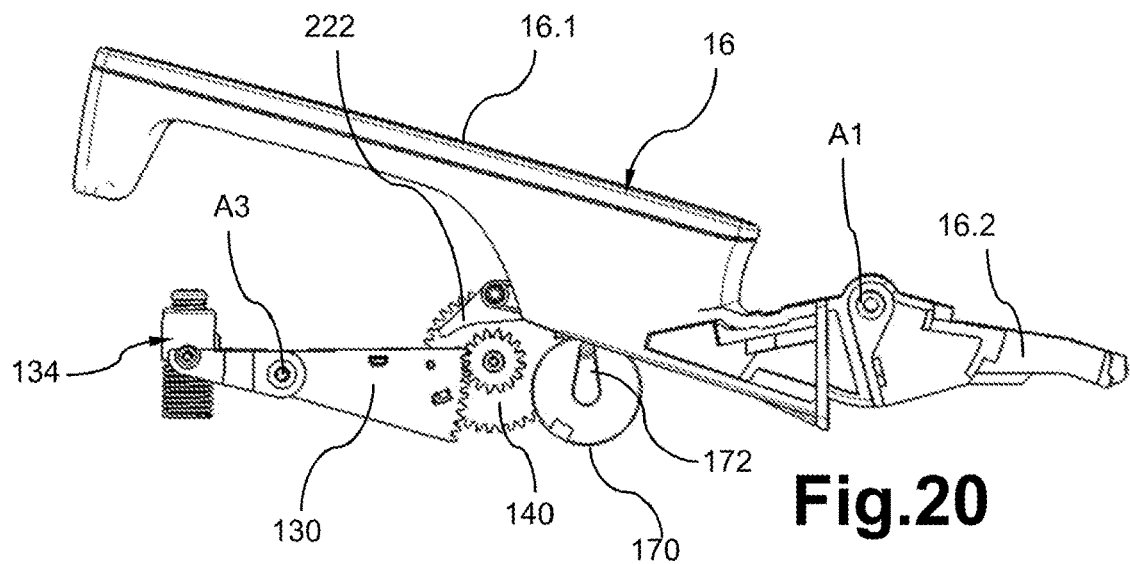

Referring to FIGS. 18 to 20, the one-way clutch 140 is capable of ensuring the following functions:
 transmitting the torque from the input gear 142 to the output gear 144, only in the clockwise direction of rotation and consequently transmitting no torque from the input gear to the output gear, in a counterclockwise direction of rotation,
 transmitting no torque from the output gear 144 to the input gear 142, irrespective of the direction of rotation of the output gear 144.

Preferably, the two pinions 142, 144 are configured to be coupled to each other thanks to respective coupling elements 146, preferably disposed on faces of the pinions 142, 144 opposite each other. For example, the coupling elements 146 comprise two or more cylinders or beads, two or more return springs of the cylinders or beads, and a barrel 148. Next, we will describe a disconnecting wheel set comprising only two cylinders.

The output gear 144 delimits a housing for partially receiving the input gear 142 so that the input gear 142 includes a peripheral outer lateral wall which slips against the peripheral inner lateral wall of the case. The output gear 144 includes two inner partition walls 150 having a circular sector shape. The two cylinders 146 are placed in the remaining space between the barrel and the circular sectors. The cylinders are compressed against the circular sectors by two springs.

As illustrated in FIGS. 18 to 20, with a counterclockwise rotation of the transmission lever 130, the input pinion 142 is driven in clockwise rotation which securely drives the output pinion 144, so that the disconnecting wheel 140 works as one single body turning about its axis A5 in the clockwise direction.

The output pinion 144 interacts with the pop-out wheel 118 through a gear. The reduction of the transmission of the handle 16 and the pop-out wheel 118 has been designed so that a push-in of the handle 16 by the user causes a rotation by 360° of the pop-out wheel 118.

The mechanism 100 further comprises a kinematic chain 160 for driving in movement the handle 16 by the drive member 110. This drive kinematic chain 160 comprises at least one drive shaft 170 provided with an eccentric 172 to transform a rotary movement of the drive shaft 170 transmitted by the drive member 110 into an alternating pivoting movement of the handle 16.

The barrel shaft 114 comprises the pop-out wheel 118 and an end portion 115A for winding the drive spring 112 as well as a drive end portion 115B configured to be coupled with the drive shaft 170. It should be understood that in the described example the direction of rotation of the barrel shaft 114 for popping-out the spring 112 is opposite to the direction of rotation of the barrel shaft 114 for driving the drive shaft 170.

Thus, preferably, the drive shaft 170 and the barrel shaft 114 comprise one-way rotatable linking means 180 so that when popping out the drive member 110, the barrel shaft 114 does not drive in rotation the drive shaft 170. Therefore, the drive shaft 1701 is rotatably secured to the barrel shaft 114 only in one direction of rotation corresponding to the direction of energy distribution by the drive member 110 in opposition with the pop-out direction.

Preferably, the one-way linking means 180 comprise a cam 184 and a blocking element 182 movable between a projecting active position engaged with the cam 184 and a stowed position disengaged from the cam 184.

For example, the cam 184 is carried by the barrel shaft 114 and the blocking element 182 is mounted inside a cylindrical cage 186 shaped into a hub body for receiving the barrel shaft 114.

Thus, the cylindrical receiver cage 186 is shaped into a hub body receiving there inside the drive end portion 115B of the barrel shaft 114. This cylindrical cage 186 is securely mounted to the drive shaft 170 by a hexagonal-type corrugated linkage 187.

For example, the blocking element 182 is movably mounted inside the cage 186 between an interaction active position projecting inside the cage 186 and an inactive position stowed tangentially to an inner wall 188 of the cage 186 and the cam 184 of the barrel shaft 114 is provided with a cam profile capable of interacting with the blocking element 182. For example, the blocking element 182 comprises a pivoting pawl elastically biased into the projecting interaction position by a spring 189. For example, the cam profile comprises a stowage ramp provided with an end stop 188 against which the rotary pawl 182 is engaged.

The pivoting pawl 182 of the receiver cage 186 allows transmitting the torque from the drive spring of the pop-out wheel 118 toward the receiver cage 186. The torque will be transmitted once the power spring 112 is popped-out by a turn of the pop-out wheel 118. The pawl 182 is returned against the cam 184 of the barrel shaft 114 by the action of its return spring.

In the flush position and on completion of pushing in the handle 16, the rotary pawl 182 faces the stop of the ramp of the cam 184, so that the pop-out wheel 118 transmits its torque (torque supplied by the power spring) to the drive shaft 170 via the receiver cage 186.

Furthermore, the drive kinematic chain 160 further comprises a means 190 for dampening the stroke of the movement of retracting the handle 16 from its ejected position toward its flush position. The dampening means 190 comprises for example a rotary damper configured to mesh with the cage 186 in order to reduce the velocity of the movement of the eccentric 172 during the phase of retracting and ejecting the handle 16 by the power spring 112. For this purpose, the cage 186 is provided with a peripheral toothing 185 for cooperating with the rotary damper 190.

In general, a rotary damper can operate in only one direction of rotation or in both directions of rotation. Preferably, in the present case, in order to avoid a stoppage of the handle by the rotary damper 190 when pushing it in, the latter is configured to operate only in the retraction and ejection phase but not during the push-in action.

Figure 9:
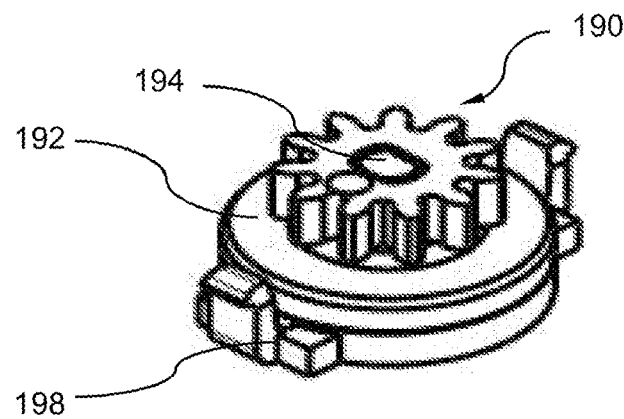
Figure 14:
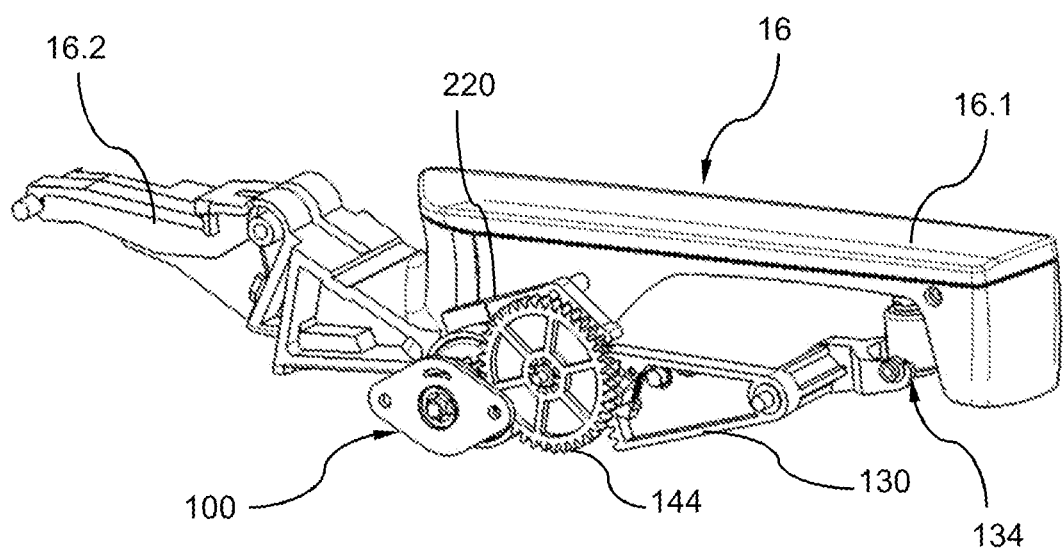
Figure 15:
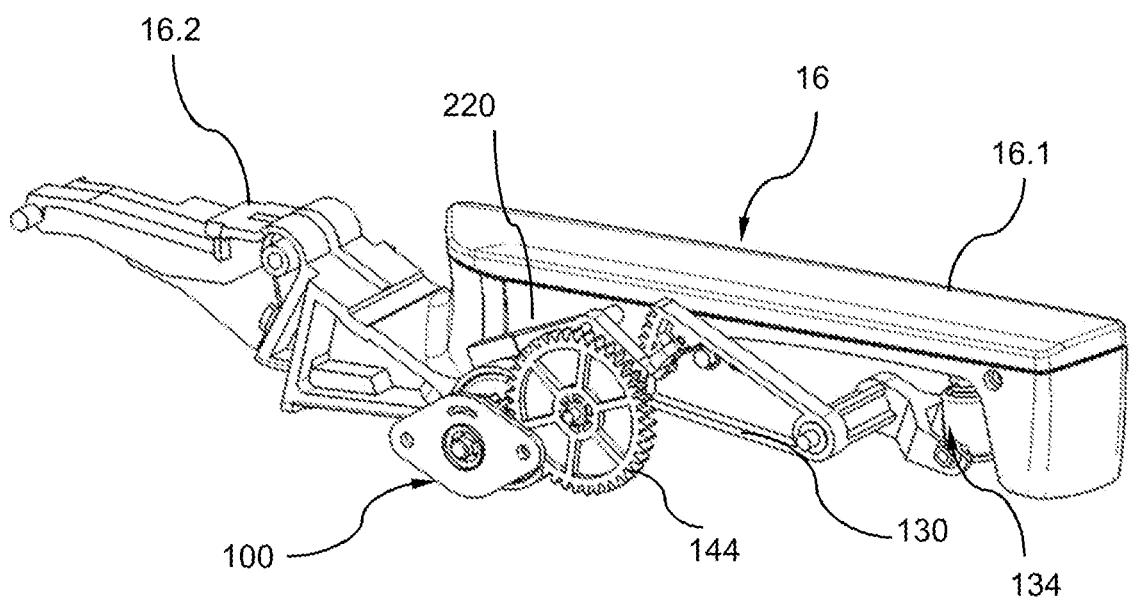

FIG. 9 represents in detail the rotary damper 190. In a manner known per se, the damper 190 comprises a case 192 and a rotary shaft 194 mounted on the case 190 so as to be able to turn about an axis of rotation and braking means, for example a viscous fluid or grease, functionally interposed inside the case 190 as well as a toothed wheel 196. The case 192 further comprises for example fastening means 198.

Preferably, the opening control device 10 also comprises a means 200 for blocking the drive kinematic chain 160 during the push-in action. Thus, the mechanism 100 comprises a member 200 for stopping the movement transmission 160 during the push-in action.

Preferably, the stop means 200 comprises an elastically-biased pawl 210 pivotally mounted on the pop-out kinematic chain 120 and a lever 220 for blocking the drive kinematic chain 160 adapted to tilt between a stop position of the chain 160 and a start position, the lever 220 having a nose 222 adapted to cooperate with the transmission pawl 210 on the completion of the push-in action so as to enable the tilting of the lever 220 and the start of the drive kinematic chain 160.

The stop lever 220 also comprises at one end opposite to its nose 222 a hook 224 adapted to engage into a notch 226 formed in the receiver cage 186. Indeed, the hooking lever 220 is pivotally mounted about an axis A7 of the case of the opening control device 10 and it is returned by a hook spring 228 against the external peripheral surface of the receiver cage 186.

Figure 4:
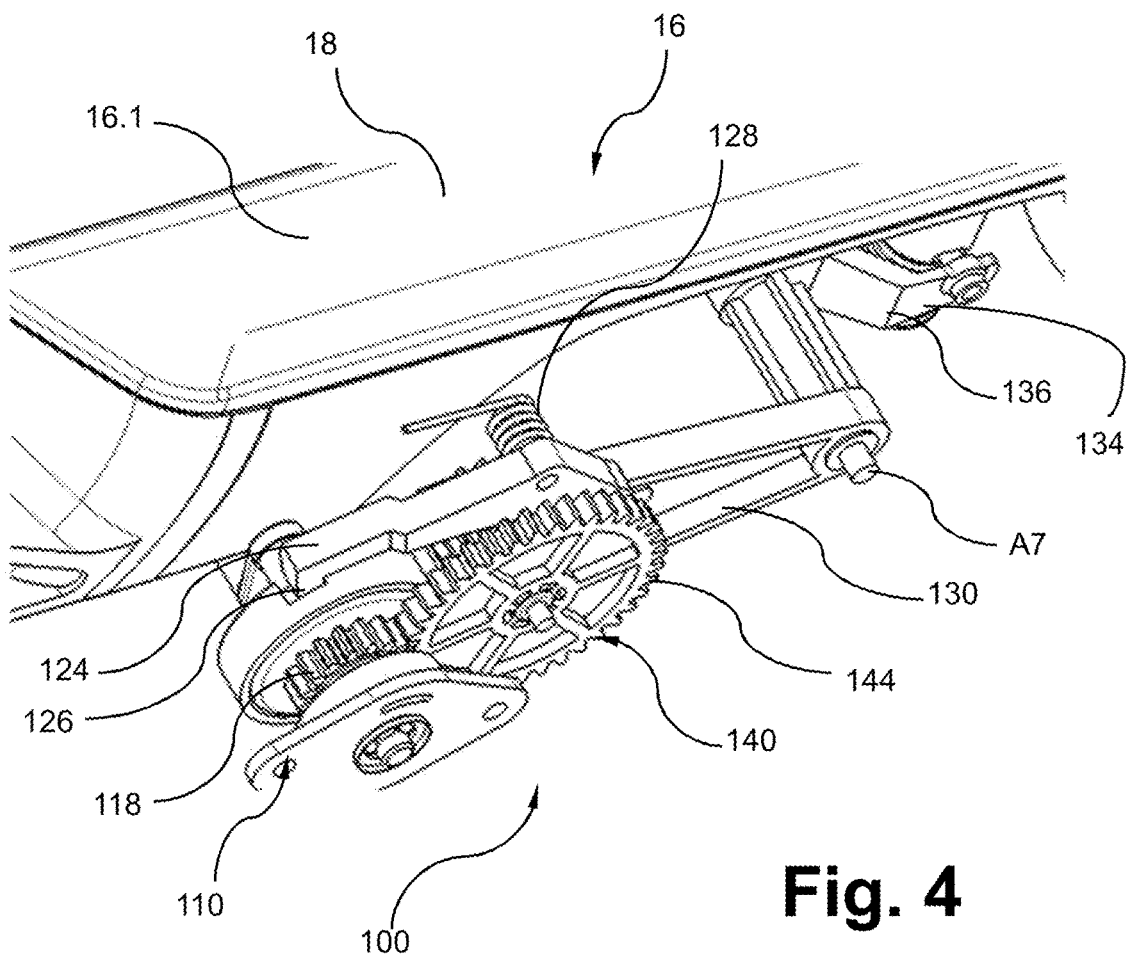
FIG. 4 is an enlarged partial top perspective view of the opening control device.

For this purpose, as illustrated in detail in FIG. 4, the pawl 210 is pivotally mounted on the transmission lever 130 with an elastic return spring 212. The hook 224 is released from the notch 226 when the user stops pushing in on the handle 16 and when the transmission lever 130 starts turning in a direction opposite to the push-in direction of the handle 16, under the effect of the stop spring 137.

We will now describe with reference to FIGS. 10 to 20 the main aspects of the operation of the opening control device according to the invention. FIGS. 10 to 13 illustrate the electrical operation of the opening control device 10 and FIGS. 14 to 20 illustrate its manual operation.

Initially, in the electrical operation mode, the handle 16 is in the flush position (FIGS. 12 and 13). In this position, the bracket 30 is returned into its return position so that the ejection bracket 30 holds the handle 16 in the flush position. The ejection arm 70 bears against the lower branch 36 of the lever and the cylinder 62 of the actuator 60 is in the retracted position.

On an order emitted by the user, the actuator 60 controls the emergence of the cylinder 62 causing the pivoting of the ejection arm 70. The latter will push against the lower branch 36 of the ejection bracket 30 against the return force exerted by the return spring 38 so as to accompany the ejection of the handle 16.

In the manual operation mode, the handle 16 is initially in a flush position. This position is illustrated for example by FIGS. 14, 16 and 18.

The user pushes in the handle 16 so that the latter compresses the elastomeric stop 134 forming the push-in member. The axial push-in of the push member 134 triggers the pop-out kinematic chain.

Thus, the transmission lever pivots (FIG. 19) about its axis in a counterclockwise direction by driving the freewheel into the clutched configuration 140 in a clockwise direction as well as the pop-out wheel 118 in a counterclockwise direction. The reduction ratio is selected so that the push-in of the handle 16 causes a complete turn of the pop-out wheel 118.

As of the release of the handle 16, the freewheel 140 is placed in an unclutched position and the clockwise rotation of the transmission lever 130 (FIG. 20), induced by the return spring of the stop 144, does not transmit any torque to the pop-out wheel 118.

Furthermore, the pivoting of the transmission lever 130 during the push-in of the handle 16 enables bringing the transmission pawl close to the spout of the hook. The transmission pawl 210 overpasses the spout 222 and passes above the spout 222 of the hook lever 220 then causing a tilting of the hook 220 and thus enabling its release from the receiver cage 186. During the push-in of the handle 16, the pawl of the transmission lever 210 folds back (is stowed) on contact with the end of the hook 224, without causing any effect on the hook 224. On the contrary, this action positions the pawl of the transmission lever 220 in the other side of the hook 210. In this manner, when the user stops pushing in the handle 16 and releases it, the pawl of the transmission lever 210 will hit the hook 224 and will release it.

Once the hook 224 is released, the drive kinematic chain 160 starts and the drive shaft 170 turns freely, driven by the power spring 112.

The eccentric 172 of the drive shaft 170 performs a complete turn. In the first half-turn, the eccentric 172 will urge the handle 16 upwards. In the second half-turn, the eccentric 172 will return the handle 16 to its initial position.

Of course, the invention is not limited to the previously described embodiments. Other embodiments within the reach of those skilled in the art may also be considered yet without departing from the scope of the invention defined by the claims hereinafter.

For example, it is possible to pop-out the drive member with several successive push-in actions of the handle. In this case, the cam 184 may comprise several blocking teeth/walls 388.

In addition, the release of the eccentric shaft 172 would be carried out at the time of reaching a predefined spring torque so that the stop member 200 would be formed only by the lever 220. For example, the lever 220 would have at one end a V-shaped hook in order to enable its release at the time of reaching a predefined torque of the drive spring.

The invention claimed is:

1. An opening control device for a door leaf of a motor vehicle comprising:
   a case configured to be mounted on the door leaf,
   a handle mounted movable in rotation relative to the case between at least a flush position in which the handle is entirely or partially housed within the case and an ejected position in which the handle is at least partially emerged from the case,
   a mechanism configured to be mechanically triggered in response to at least one push-in action into the case of the handle, completion of the push-in action causing the mechanism to be triggered,
   wherein the mechanism is configured to automatically drive in movement the handle over all of a stroke starting from a pushed position of the handle to the flush position through the ejected position, the mechanism comprising a drive member and a kinematic assembly that transmits the push-in action of the handle to the drive member, the drive member being configured to accumulate a mechanical energy during the push-in action of the handle and to restitute a mechanical drive energy for movement of the handle as of the completion of the push-in action to enable an automatic retraction of the handle into the flush position without any electrical assistance, the drive member comprising a barrel, a barrel shaft and a drive spring housed within the barrel and wound into a spiral around the barrel shaft.

2. The opening control device according to claim 1, wherein the drive member comprises a pop-out wheel provided with peripheral toothing securely mounted to the barrel shaft.

3. The opening control device according to claim 1, wherein the drive spring comprises a first end internal to the spiral and fastened to the barrel shaft and a second end external to the spiral and fastened to the barrel.

4. The opening control device according to claim 1, wherein the kinematic assembly comprises a first kinematic chain for mechanically popping-out the drive member and a second kinematic chain for mechanically driving the handle by the drive member.

5. The opening control device according to claim 4, wherein the second kinematic chain comprises a drive shaft for driving the handle in movement and an eccentric that transforms a rotary movement of the drive shaft into an alternating pivoting movement of the handle.

6. The opening control device according to claim 5, wherein the drive member comprises a barrel, a barrel shaft and a drive spring within the barrel, and the drive shaft and the barrel shaft comprise one-way rotatable linking means.

7. The opening control device according to claim 6, wherein the one-way rotatable linking means comprise a cam with at least one cam wall and a blocking element, the blocking element being movable between a projecting active position where the blocking element engaged with the cam wall and a stowed position where the blocking element is disengaged from the cam.

8. The opening control device according to claim 7, wherein the cam is carried by the barrel shaft and the blocking element is mounted inside a cylindrical cage shaped into a hub body for receiving the barrel shaft.

9. The opening control device according to claim 4, wherein the first kinematic chain comprises a push member with a spring forming a push-in stop of the handle and configured to urge a movement when releasing the handle.

10. The opening control device according to claim 4, wherein the first kinematic chain comprises at least one transmission means for transmitting the push-in action of the handle to the drive member.

11. The opening control device according to claim 10, wherein the transmission means comprises a lever pivotally mounted relative to the case and the lever has a circular sector shape pivotally linked at one end to a push-in stop member of the handle and forming at the other end an arc of circle of a toothed gear.

12. The opening control device according to claim 10, wherein a transmission ratio from the transmission means to the drive member is such that the push-in action of the handle causes an angular rotation of a pop-out wheel of the drive member by $2\pi$.

13. The opening control device according to claim 4, wherein the mechanism comprises a blocking means for blocking the second kinematic chain during the push-in action.

14. The opening control device according to claim 13, wherein the blocking means comprises an elastically-biased transmission pawl pivotally mounted on the first kinematic chain and a lever for blocking the second kinematic chain, the lever being mounted so as to tilt between a stop position and a start position of the second kinematic chain, the lever having a nose adapted to cooperate with the transmission pawl when releasing the handle so as to tilt the lever from the stop position to the start position of the second kinematic chain.

15. The opening control device according to claim 13, wherein the blocking means comprises a lever for blocking the second kinematic chain, the lever being mounted so as to tilt between a stop position and a start position of the second kinematic chain, the lever being adapted to tilt into the start position when exceeding a pop-out predefined spring torque threshold of the drive member.

16. The opening control device according to claim 4, wherein the first kinematic chain comprises a one-way transmission gear train from the handle toward the drive member.

17. The opening control device according to claim 16, wherein the one-way transmission gear train comprises a freewheel, and the freewheel comprises a one-way clutch comprising a pair of toothed pinions coupled to each other in rotation at least in one direction.

18. The opening control device according to claim 4, wherein the second kinematic chain comprises a dampening member configured to slow down the stroke of the handle at least from the ejected position to the flush position.

19. The opening control device, according to claim 1, comprising a pivot lever for pivoting the handle in ejection and/or retraction and means for electrically actuating the pivot lever.

20. The opening control device according to claim 19, wherein the pivot lever has a bracket shape inside which the handle can be engaged and comprises at least one upper cross-bar for bearing on an upper bearing wall of the handle and a lower cross-bar for bearing on a lower bearing wall of the handle and the pivot lever comprises a member for elastically returning the pivot lever.

21. The opening control device according to claim 19, wherein the pivot lever remains immobile during pop-out and mechanical driving of the handle by the drive member.

\* \* \* \* \*